April 14, 1925.

J. D. HERRON 1,533,595

HOISTING TRUCK

Filed Dec. 19, 1924   3 Sheets-Sheet 1

Inventor

Joseph Dale Herron

By O'Neill & Dennis

Attorneys

April 14, 1925. 1,533,595
J. D. HERRON
HOISTING TRUCK
Filed Dec. 19, 1924  3 Sheets-Sheet 2

Inventor
Joseph Dale Herron
By O'Neill & Dunn
Attorneys

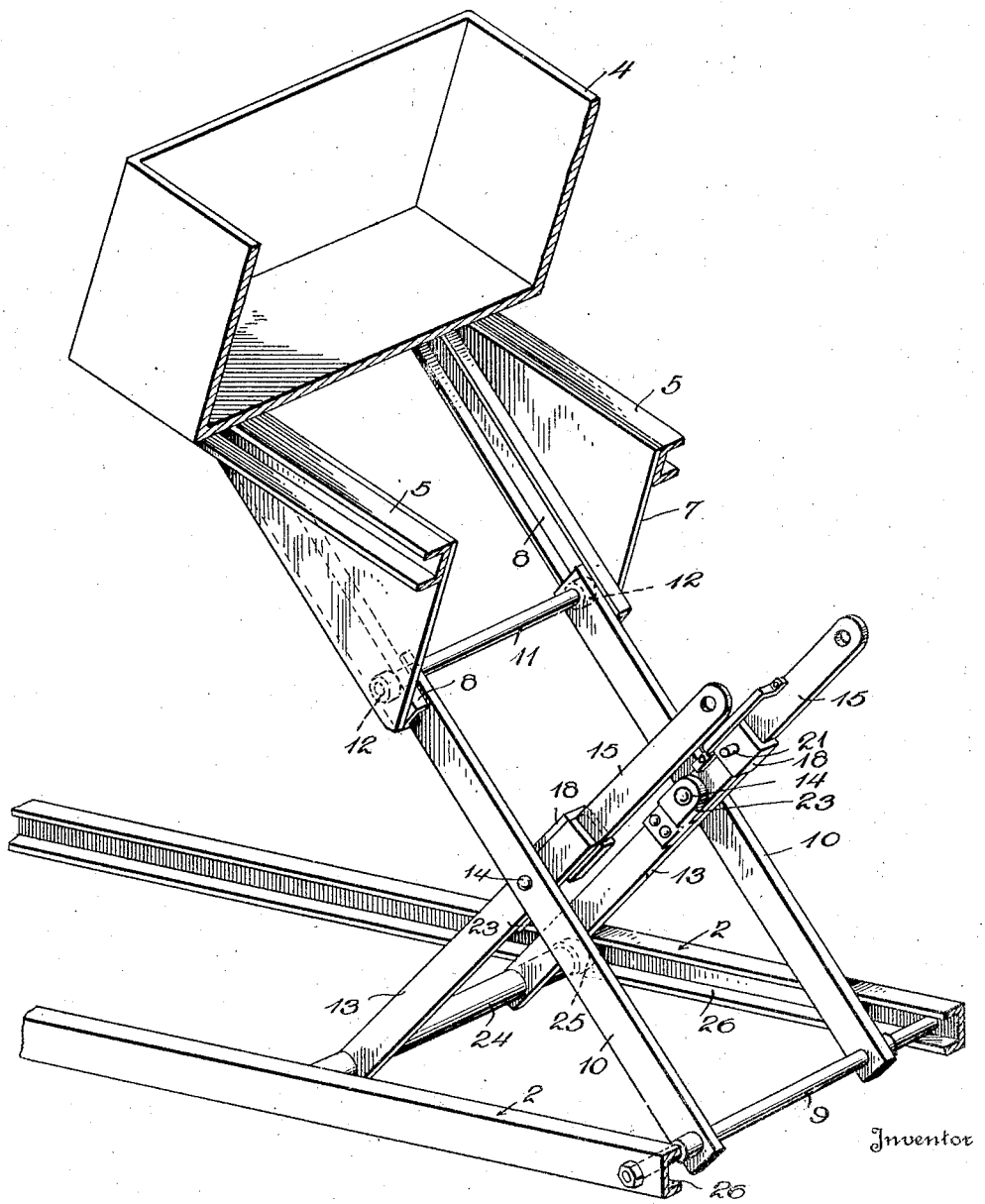

Patented Apr. 14, 1925.

1,533,595

UNITED STATES PATENT OFFICE.

JOSEPH DALE HERRON, OF TRENTON, NEW JERSEY, ASSIGNOR TO FITZ GIBBON & CRISP, INC., OF TRENTON, NEW JERSEY, A CORPORATION OF NEW JERSEY.

HOISTING TRUCK.

Application filed December 19, 1924. Serial No. 757,015.

*To all whom it may concern:*

Be it known that I, JOSEPH DALE HERRON, a citizen of the United States, residing at Trenton, in the county of Mercer and State of New Jersey, have invented certain new and useful Improvements in Hoisting Trucks; and I do hereby declare the following to be a full, clear, and exact description of the invention, such as will enable others skilled in the art to which it appertains to make and use the same.

The present invention relates to certain improvements in that type of dumping automobile trucks, provided with a body or superstructure carried by a fixed frame mounted on the chassis of the truck, and in which the body is raised and simultaneously tilted at certain angles, thereby facilitating the operation of discharging the contents of the body from one end thereof.

It is customary to equip a dumping truck of this character with an extensible discharge chute at the rear end, and to elevate the entire load-carrying body to a point above the truck chassis. It is also desirable to provide means for elevating the body and simultaneously tilting it to incline downwardly and rearwardly at varying angles, dependent upon whether it is desired to deliver the load to a point adjacent or remote from the rear end of the vehicle, the extensible chute being adjusted accordingly.

It is the object of this invention to provide means for facilitating the operation of adjusting the load-carrying body prior to its elevation, in order that it will assume the desired predetermined inclined position upon being elevated.

Other objects of the invention will be disclosed in the following specification when taken in connection with the drawings forming a part thereof, in which similar reference characters indicate similar elements throughout the several views.

In said drawings:

Fig. 4 is a fragmentary perspective view showing the links in topmost position, a portion of the body being removed.

Figure 1:
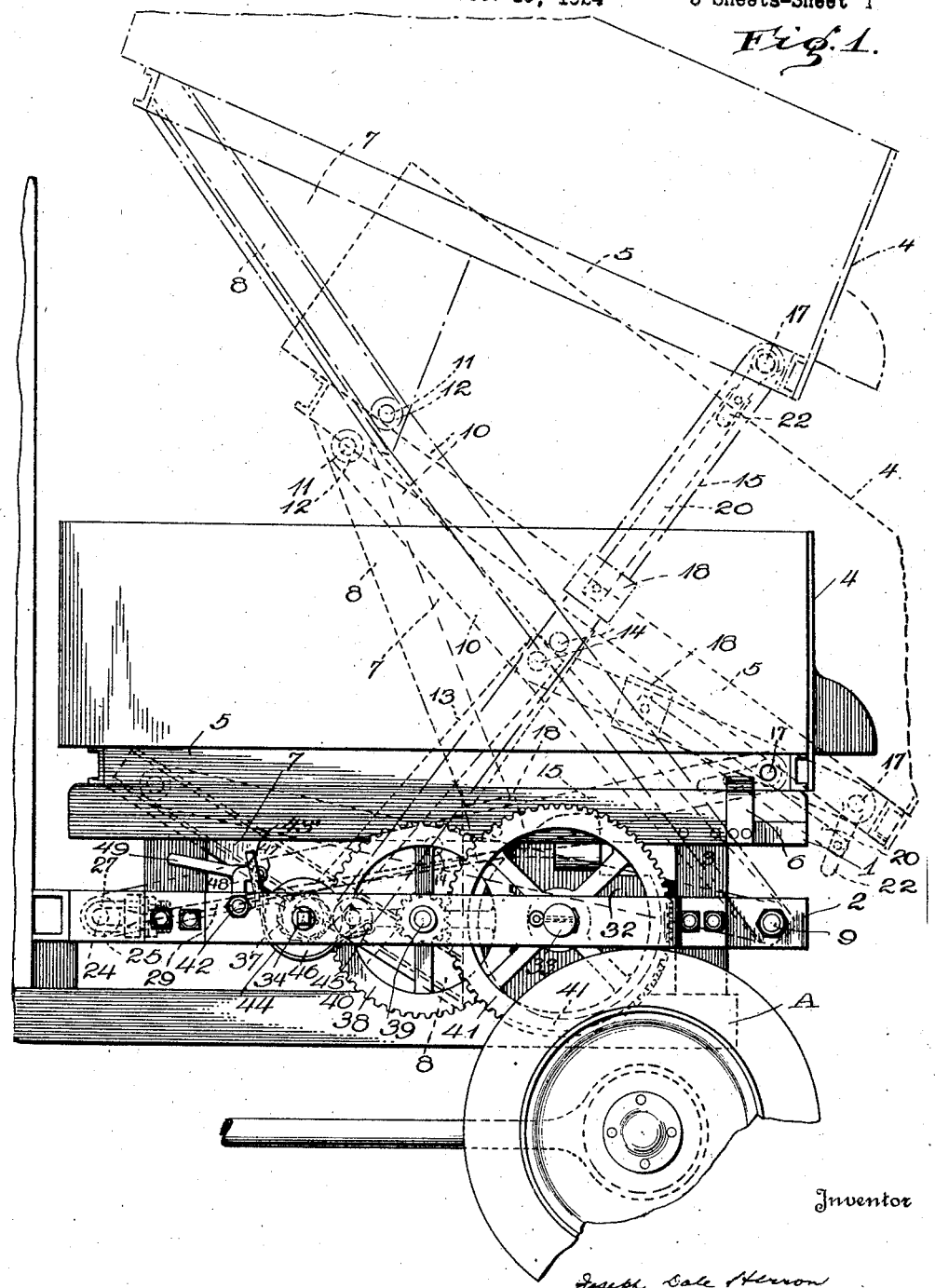
Fig. 1 is a side elevation of the body-supporting portion of a frame of a truck equipped with my invention, and showing the lowest position of the body in full lines, and the intermediate positions in dotted and dot-and-dash lines.

Now referring specifically to the drawings, A indicates an automotive vehicle of any type, and carrying a body-supporting frame preferably comprising upper parallel metallic side rails 1, and lower rails 2, on each side, said rails being rigidly secured each to each by metal straps 3. The load-carrying body portion of the vehicle is indicated by the numeral 4, and is provided with the usual parallel sides and ends, and is also equipped at the bottom with parallel side rails 5 adapted to register with and rest upon the side rails 1 of the supporting frame, outwardly-flaring vertically extending guide straps 6 being secured to the outer faces of the rails 1, whereby to engage the rails 5 of the body 4 and guide the latter in its vertical movements.

Secured to the front of the supporting rails 5, 5, of the body 4, is a downwardly inclined housing 7, provided on each side with inwardly facing tracks 8. Pivotally mounted at one end, upon a rod 9, extending between the rails 1, are two parallel elevating links 10, 10 which are rigidly connected each to each at the other end by means of a rod 11. The outer ends of the rod 11 carry rollers 12, 12, adapted to fit into the tracks 8, 8 in the housing 7, whereby to provide an anti-friction bearing for the upper ends of the links 10, 10, as illustrated in Fig. 4.

Figure 2:
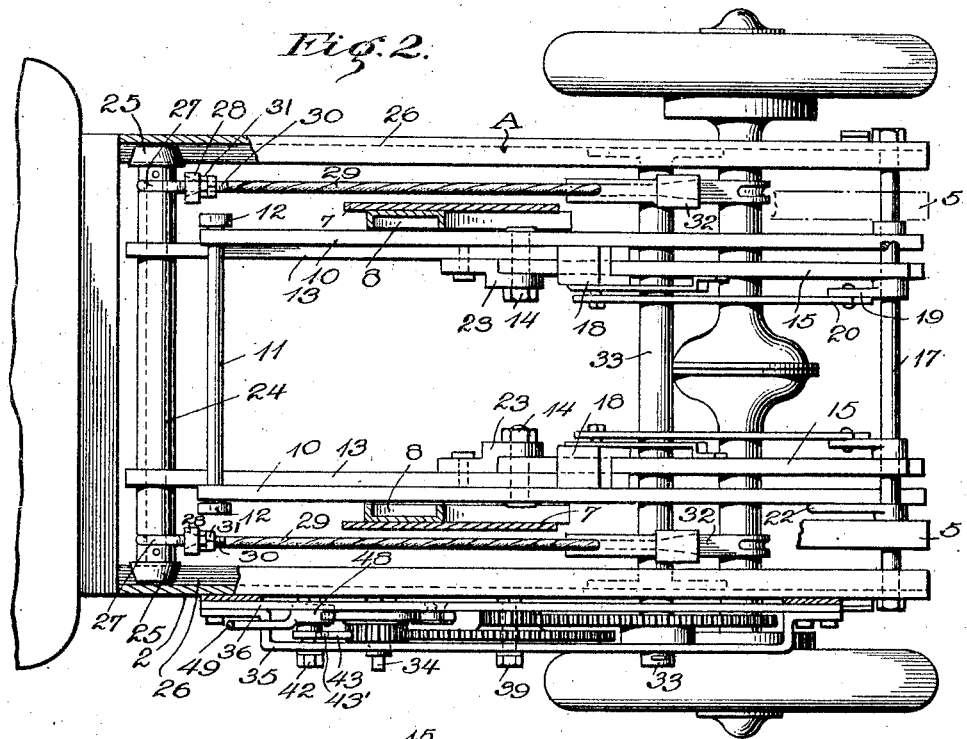
Fig. 2 is a top plan view of the structure shown in Fig. 1 with the body removed.
Figure 3:
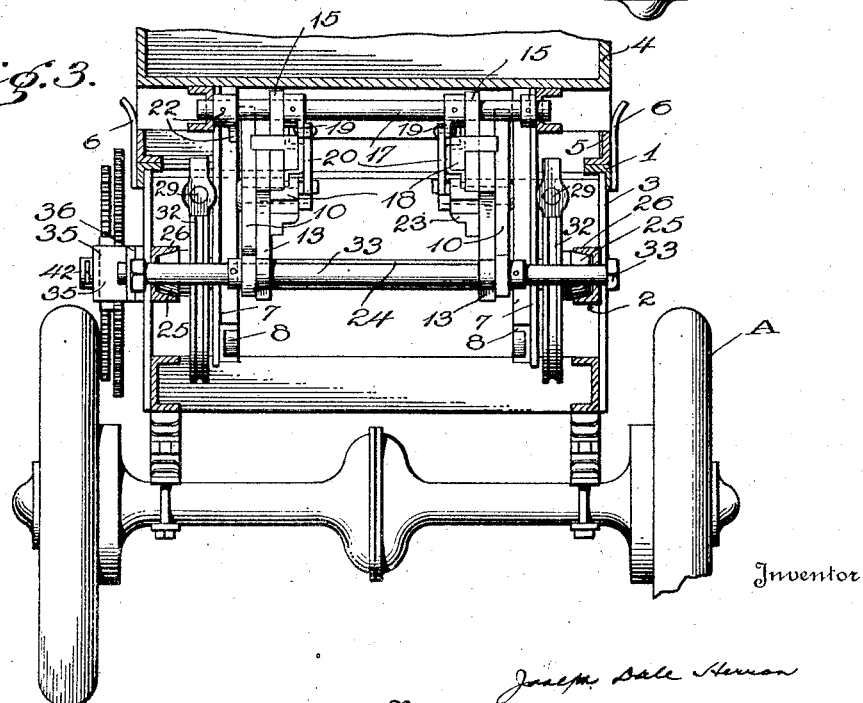
Fig. 3 is an end elevation partly in section of the structure, showing the lower portion of the body.

A pair of elevating arms 13 are positioned between and pivotally secured to the links 10, 10, as indicated in Fig. 4, by pins 14, and a pair of stub-arms 15 are pivotally connected at the lower end to the pins 14 which connect the upper ends of the arms 13 to the links 10, the other ends of the stub-arms 15 being pivotally secured to a rotatable rod 17, extending between the rear ends of the rails 5 of the body 4, as indicated in Fig. 3. The lower ends of the stub-arms 15 overlap the upper ends of the arms 13, as clearly shown in Fig. 2, whereby both may turn upon the pins 14 and assume a position at an angle each to each.

In order to rigidly secure the arms 13 and the overlying stub-arms 15 against rotation each to each, I utilize strap members 18, best shown in Fig. 2, said strap members being slidable longitudinally of the stub-arms 15 and adapted to be projected into position to straddle the adjacent ends of the arms 13. When the strap member 18 is in the position shown in Fig. 2, the arms 13 and 15 are held in alignment thereby, and cannot pivot around the pins 14, but, when the member 18 is retracted upon the arms 15, both the latter and the arms 13 may pivot around the pins 14 as will be understood.

For moving the strap 18 longitudinally of the stub-arms 15, I provide a crank arm 19, rigidly connected to the rotatable rod 17. A rod 20 is pivoted at one end to the arm 19, and at the other end to a pin 21 carried on the outer surface of the strap member 18. As shown in the drawings there is a separate installation as just described for each of the arms 15. A hand lever 22 is secured to the outer end of the rotatable rod 17, and it will be obvious that a movement of said lever will rotate the rod and move the strap 18 into such position on the pins 14, or to release the arms for permitting such movement. In order to furnish proper support for the inner ends of the pins 14, I provide on the inside faces of each of the arms 13, a supporting bracket 23, clearly shown in Figs. 2 and 4. The lower end of the arm 15 is rounded to permit of the proper rotative movement under pivotal action of the arms.

The lower ends of the links 13 are pivotally mounted on a rod 24 provided at each end with a roller 25 which runs in a track 26 provided in the channel bar 2. A cable clip 27 surrounds and is rigidly secured to each end of the rod 24, and carries a rearwardly extending plate 28 which is provided with a tapered aperture for the reception and permanent detention of the enlarged tapered end of a metallic operating cable 29. The end of each clip 28 is screw-threaded at 30, and a nut 31 serves to rigidly secure the end of the cable in position within the clip 30, as best illustrated in Fig. 2.

The cables 29, at each side, extend rearwardly of the chassis, and are secured to and trained over a portion of an eccentric disk pulley 32, mounted on a shaft 33, having bearing in the channel bar 2. In the structure just described, it is obvious that if the rod 24 is pulled towards the shaft 33, or towards the rear of the truck chassis, the pivot pins 14, connecting the links 10, will be raised to a higher plane, and elevate the upper ends of said links and hence the body 4 of the vehicle.

To rotate the shaft 33 for the purpose of reciprocating the rod 24, I provide a stub shaft 34 extending through a bracket 35, secured to a plate 36, mounted on the outer face of the channel bar 2. The shaft 34 carries a pinion 37 in mesh with a large gear 38 mounted on a rotative shaft 39 journaled in the bracket 35 and the plate 36, said gear 38 in turn carrying a pinion 40, in mesh with a large gear 41 mounted on the shaft 33 which carries the eccentric pulleys 32. Through this train of power-multiplying gearing, the shaft 33 may be rotated at will to pull the rod 24 towards the rear of the vehicle and to thereby elevate the body 4. The outer end of the shaft 34 may be squared for the reception of a suitable crank, not shown, whereby to rotate the shaft manually, or it may be equipped with a gear or pulley adapting it to be geared to the motor of the vehicle in order that it may be rotated by power from said motor. During the rotation of the shaft 34, a ratchet mechanism is utilized to prevent backward rotation thereof under the weight of the load in the body 4. Said mechanism is shown in Fig. 1 and includes a rotative shaft 42 extending between the bracket 35 and plate 36, and carrying a pivoted detent or latch 43, normally engaging the teeth of the pinion 37, and preventing rearward movement of the said pinion, as will be understood. An operating handle 43' is secured to the latch 43, as shown in Fig. 1.

Ordinarily the weight of the body 4 is sufficient in itself to reversely rotate the train of gearing as described, after the latch 43 has been raised, and to allow the body to descend upon the frame of the vehicle, subsequent to the discharge of the load. In order to brake the speed of reverse rotation of the gearing, I provide a band 44 which is secured at one end to a stop pin 45 carried between the bracket 35 and the plate 36, and engaging the lower surface of a roller 46, carried by the shaft 34. The free end of the band 44 carries a loop 47 adapted to extend over the upper angled end of a bell crank 48, rigidly secured to the shaft 42, and a handle 49 is connected to the crank 48. It is therefore clear that a depression of the handle 49 will cause the band 44 to more tightly engage the roller 46 and retard the rotation of the shaft 34, and that an elevation of said handle will permit the acceleration of such rotation.

Fig. 1 shows the normal position of the body 4 in full lines, and it is to be noted that the housing 7, and the links 10 and arms 13 and 15 are disposed as indicated in Fig. 2, the strap member 18 connecting the arms 13 and 15, in which position the combined length of the arms is the same as the length of the links 10. In this position the rod 24 is in its forward position in the track 26, and the rollers 12 on the rod 11 are in their forward or upward position in the tracks 8 of the housing 7.

Assuming it is now desired to lift the body 4 to the dotted position shown in Fig. 1, the operator pulls on the handle 22 and rotates the rod 17 to cause the strap member 18 to slide upwardly upon the arms 15 and thereby permit the latter to pivot around the pins 14. The shaft 34 is then rotated to draw the rod 24 towards the rear of the truck and, as the cables 29 pull the rod 24 towards the shaft 33, the movement of the forward lower ends of the links 13 causes a pivotal movement at the center of the links around the pins 14, simultaneously raising the pins 14 into a higher plane. Since the strap member 18 is now in uncoupling position, the lower ends of the stub-arms 15 pivot around the pins 14, and the rear end of the body 4, to which the upper ends of the arms 15 are pivoted, remains in contact with the frame of the vehicle, while the front end of the body is raised to the position shown in dotted lines.

When it is desired to raise the body 4 to the highest position, shown in dot and dash lines in Fig. 1, the strap members 18 are allowed to remain in position coupling the arms 13 and 15. Upon rotation of the shaft 33 the links 10 and the arms 13 and 15 are all raised to the position shown, since pivotal action of said arms, around the pins 14, is now impossible.

From the foregoing it is obvious that I have provided a construction adapted for easy adjustment in order that the body 4 may be so raised and tilted as to discharge the load to a point immediately adjacent the rear end of the truck, as when a load of coal is to be delivered at the curb, or to discharge the coal or other commodity through a chute ordinarily carried by the body 4, and adapted to be extended to a point removed from the end of the body. Manifestly the mechanisms may be applied to horse-drawn vehicles, as will be understood.

Various embodiments of the structure herein disclosed may be suggested to those skilled in the art, but I claim as my invention all such modifications as fall fairly within the scope of the appended claims.

What I claim is:

1. Apparatus of the character described, comprising, in combination with a vehicle frame and a load-carrying body, hoisting links connected to a fixed pivot carried by the frame and slidably engaging said body, inclined hoisting arms connected at the lower ends to a movable pivot mounted on the frame and pivotally connected at the upper ends to said links, hoisting stub-arms pivotally connected at the lower ends to said links and at the other ends to said body, means for moving the pivot at the lower ends of said inclined hoisting arms, whereby to raise the upper ends of said links, members movable into position to detachably connect the said hoisting arms and the said stub-arms in alignment, and means carried at the end of the body and adapted for actuation to move said members into operative or inoperative position.

2. Apparatus of the character described, comprising, in combination with a vehicle frame and a load-carrying body, hoisting links connected to a fixed pivot carried by the frame and slidably engaging said body, inclined hoisting arms connected at the lower ends to a movable pivot mounted on the frame and pivotally connected at the upper ends to said links, hoisting stub-arms pivotally connected at the lower ends to said links and at the other ends to said body, means for moving the pivot at the lower ends of said inclined hoisting arms, whereby to raise the upper ends of said links, means for detachably connecting the said hoisting arms and the said stub-arms in alignment, said means comprising a strap member mounted on one of said arms and movable into position to embrace the adjacent ends of both arms and to prevent relative pivotal movement of said arms, and means for moving said strap member.

3. Apparatus of the character described, comprising, in combination with a vehicle frame and a load-carrying body, hoisting links connected to a fixed pivot carried by the frame and slidably engaging said body, inclined hoisting arms connected at the lower ends to a movable pivot mounted on the frame and pivotally connected at the upper ends to said links, hoisting stub-arms pivotally connected at the lower ends to said links and at the other ends to said body, means for moving the pivot at the lower ends of said inclined hoisting arms, whereby to raise the upper ends of said links, means for detachably connecting the said hoisting arms and the said stub-arms in alignment, said means comprising a strap member mounted on one of said arms and movable into position to embrace the adjacent ends of both arms and to prevent relative pivotal movement of said arms, and means for moving said strap member, said means comprising a rotative rod, a crank arm connected to said rod and pivotally connected to said strap member, and a handle for rotating said rod.

In testimony whereof I affix my signature.

JOSEPH DALE HERRON.